United States Patent [19]

Auber

[11] Patent Number: 4,896,347

[45] Date of Patent: Jan. 23, 1990

[54] INTERACTIVE VIDEO COMMUNICATIONS SYSTEM

[76] Inventor: Oliver Auber, 4, Passage Saint-Avoye, 75003 Paris, France

[21] Appl. No.: 247,770

[22] Filed: Sep. 22, 1988

[30] Foreign Application Priority Data

Sep. 23, 1987 [FR] France .................. 87 13140

[51] Int. Cl.[4] ......................................... H04M 11/00
[52] U.S. Cl. ........................................ 379/96; 379/105; 358/146
[58] Field of Search .................... 358/84–86, 358/146, 183; 379/92, 96, 102, 104, 105; 455/2, 4, 5

[56] References Cited

U.S. PATENT DOCUMENTS

| | | | |
|---|---|---|---|
| 4,538,174 | 8/1985 | Gargini et al. | 358/86 |
| 4,575,579 | 3/1986 | Simon et al. | 178/4 |
| 4,616,263 | 10/1986 | Eichelberger | 358/185 |

FOREIGN PATENT DOCUMENTS 0113022 7/1984 European Pat. Off.
0222920 5/1987 European Pat. Off.
DE3418995 11/1985 Fed. Rep. of Germany.

OTHER PUBLICATIONS

F. DuCastel, "New Video Communications Networks in France", *Commutation & Transmission*, No. S (Special), 1985, pp. 7–18.
"Videotex Terminals for the INS Model System", Yukio Kobayashi, et al, 418 Review of the Electrical Communication Laboratories, 33 (1985) Mar., No. 2, Tokyo, Japan, pp. 277–283.
"Picture Tranmission for Videotex", King N. Ngan, et al, IEEE Transactions on Consumer Electronics, CE-31(1985), Aug., No. 3, New York, U.S.A.
"Bildschirmtext–Terminals", Peter Joachim Koch, et al, Telecom report 8 (1985), pp. 350–352.

*Primary Examiner*—Keith E. George
*Attorney, Agent, or Firm*—Weingarten, Schurgin, Gagnebin & Hayes

[57] ABSTRACT

Means are provided for storing videotex-type graphics information in a server center (10) connected to a telephone network (14), with said graphics information relating to at least one image, and for modifying the stored graphics information in response to instructions transmitted from terminals (18) connected to the telephone network and provided with screens (18a) on which at least a portion of said image can be displayed. The graphics information stored in the server center is converted into television-type video signals so as to enable an image to be displayed on one or more television receiver screens (34) or television image projectors, with the displayed image corresponding, at least in part, to the image represented by the graphics information stored at any instant in the server center. As a result, each change made to the graphics information from a terminal such as a "Minitel" appears immediately in the image displayed by the screen of a television receiver.

4 Claims, 3 Drawing Sheets

INTERACTIVE VIDEO COMMUNICATIONS SYSTEM

The present invention relates to a video communications system, and more particularly to a system providing viewers with the facility of intervening in real time in the contents of a television program being broadcast.

BACKGROUND OF THE INVENTION

The companies that produce and broadcast television programs often seek participation from viewers in their homes, in particular for programs relating to games or discussions. However, user intervention, which generally takes place by telephone, remains limited in scope and does not influence the immediate contents of the program.

In the hope of obtaining more active viewer participation and of obtaining loyal viewers, television companies may find it advantageous to offer viewers the facility of acting on a broadcast program in real time, including acting on the image.

The object of the present invention is to provide an interactive video communications system which offers such a facility.

SUMMARY OF THE INVENTION

The present invention provides an interactive video communications system, comprising a server center connected to a telephone network, means for storing videotex-type graphics information in the server center, said information relating to at least one image, and terminals connected to the telephone network and provided with screens on which at least a portion of the image may be displayed, wherein:

the server center includes means for changing the stored graphics information in response to instructions transmitted by users from the terminals; and means are connected to the server center for converting the graphics information stored in the server center into television-type video signals, thereby enabling an image to be displayed on the users on one or more television receiver screens or television image projectors other than the screens of the terminals, with at least a portion of the displayed image corresponding to the image represented by the graphics information stored at any moment in the server center.

Advantageously, the video signals are broadcast or inserted into signals being broadcast by a television transmitter, thereby enabling the image to be displayed on television receivers.

Thus, a viewer provided with a subscriber terminal connected to the telephone network is given the facility of accessing the server center in order to modify the stored graphics information, with the modification appearing immediately in the image displayed on the television receiver. Further, when connected to conventional remote bulletin board systems, the system of the present invention also allows participants to communicate with one another.

The system of the invention can be used with various different types of television program, for example games and discussions. In particular, during discussion broadcasts, viewers can express their opinions by selecting a free image element in order to attribute one or more particular color(s) thereto. The overall image representing the opinions of the viewers may be broadcast either permanently as a backdrop to the studio set, or intermittently, or else as an overlay.

Preferably, the graphics information stored in the server center represents an image whose format is a multiple of the format of an image displayed on the screen of a terminal, said information being converted into the form of video signals representing a television image, such that an image displayed on the screen of a terminal represents a portion of an image displayed on a television receiver screen.

The terminal screen which may have less definition and be smaller in size than the screen of the television receiver then constitutes a window displaying only a portion of the television image. Advantageously, the position of the window relative to the television image is adjustable and means are provided for giving access to any image element location available on the terminal screen. Once access has been obtained, the user may select a special pattern and/or a special color for said image element which is constituted by an elementary square or by a plurality of adjacent elementary squares.

In a variant, the system of the invention may be used locally, for example in a public place or at an exhibition. Terminals are made available to visitors and the video image is transmitted to a video projector for display on a big screen.

BRIEF DESCRIPTION OF THE DRAWINGS

An embodiment of the invention is described by way of example with reference to the accompanying drawings, in which.

MORE DETAILED DESCRIPTION

Figure 1:
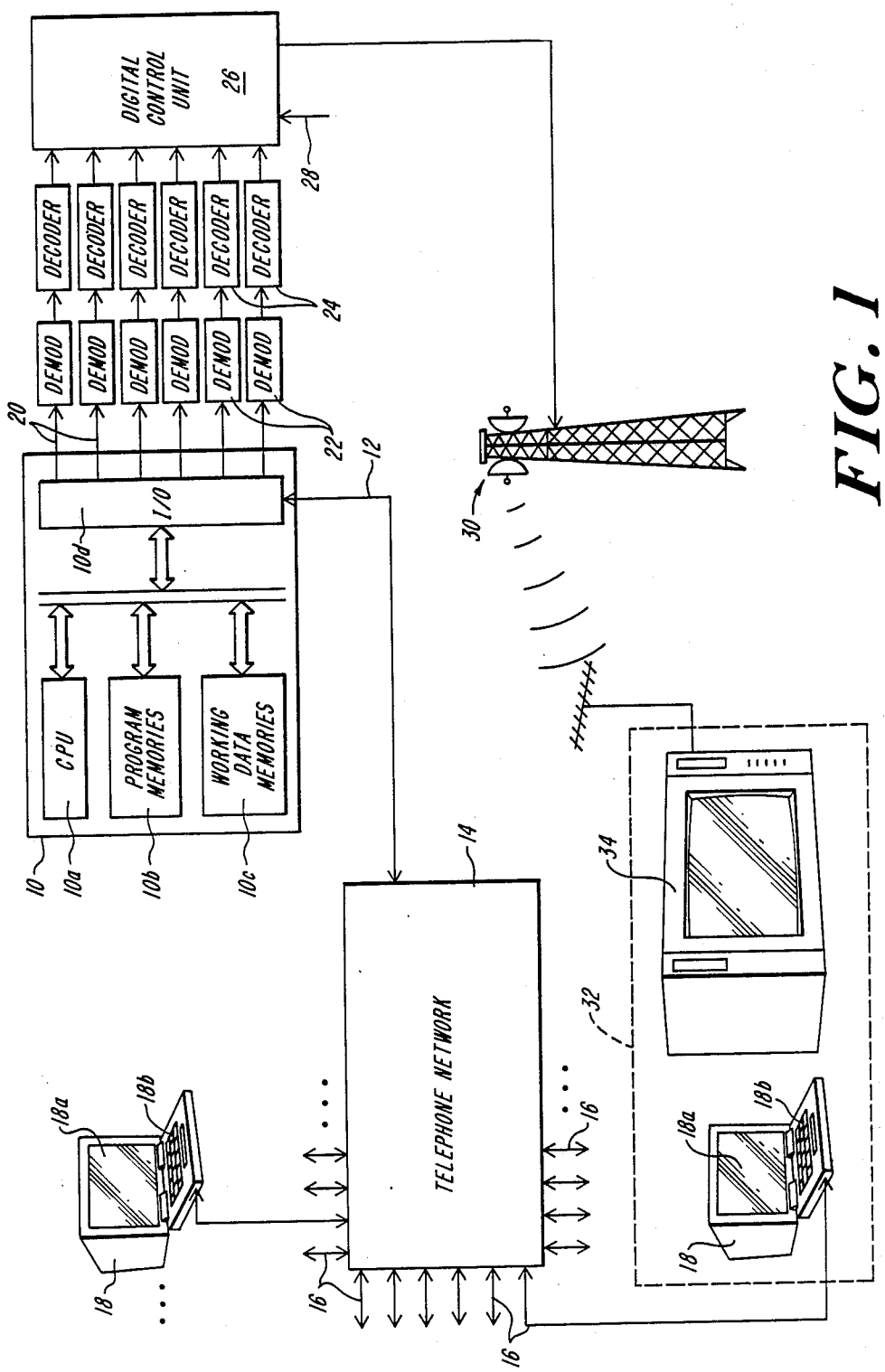
FIG. 1 is a highly diagrammatic general view of one embodiment of a system in accordance with the invention.

The telecommunications system shown in FIG. 1 comprises a server center 10 connected by a connection 12 to a switched telephone network shown diagrammatically at 14. Subscriber lines 16 are connected to the telephone network, with some of the lines being connected to specialized terminals 18 such as "Minitels" each having a screen 18a and a keyboard 18b for the purpose of establishing a dialog with the server center.

The server center 10 is, in well-known manner, a computer system including a processor unit 10a, program memories 10b, working data memories 10c, and input/output circuits 10d.

One of the working memories stores graphics information of the videotex type and representing an image. This overall image has a format corresponding to a multiple of the format of the images formed on the screens 18a (in the example illustrated, this multiple is equal to six). In other words, the overall image represented by the graphics information constitutes a mosaic of several subimages each of which is the same size as one page displayable on a screen 18a.

The graphics information corresponding to each subimage and thus having the appropriate format for transmission over a telephone line by videotex, is conveyed by means of a respective telephone line 20 (of which there are six in the example shown) to demodulators 22. The demodulated signals are applied to decoders 24 which transform the received videotex type signals into television type video signals. Various types of videotex-to-video decoder are available on the market. The videotex-to-video demodulation and coding functions may be performed merely by using "Minitel"-type terminals equipped with specialized outputs (e.g. "Peritel" connectors) which deliver a video signal directly.

The video signal delivered by the decoders 24 are transmitted to a control unit 26 which generates an analog video signal representing the overall image stored in the server center. Television control units are well-known devices. A digital unit such as that sold under the reference A.D.O. by the U.S. firm "Ampex" may be used, for example. This digial control unit receives the decoded video signals in analog form and generates an analog signal representative of the image formed by a mosaic of the subimages transmitted over the lines 20.

It is not possible to reproduce an entire television image on the screen of a conventional terminal, such as the "Minitel", with full TV definition. That is why the overall image represented by the graphics information stored in the server center has a format which is a multiple of the format visible on the screen of a terminal 18.

The video signal generated by the control unit 26 is transmitted to a television transmitter 30. Where appropriate, the signal formed by assembling the subimages may be combined by the control unit 26 with at least one other video signal transmitted over a path 28 for the purpose, for example, of performing an overlay or some other special effect. It is also possible to broadcast the reconstituted overall image as a background to the television studio set, for the purpose of including it in the broadcast images.

The system proposed provides a viewer possessing a terminal 18 at home 32 with the facility of acting in real time on the broadcast image as received by a television receiver 34.

Figure 2:
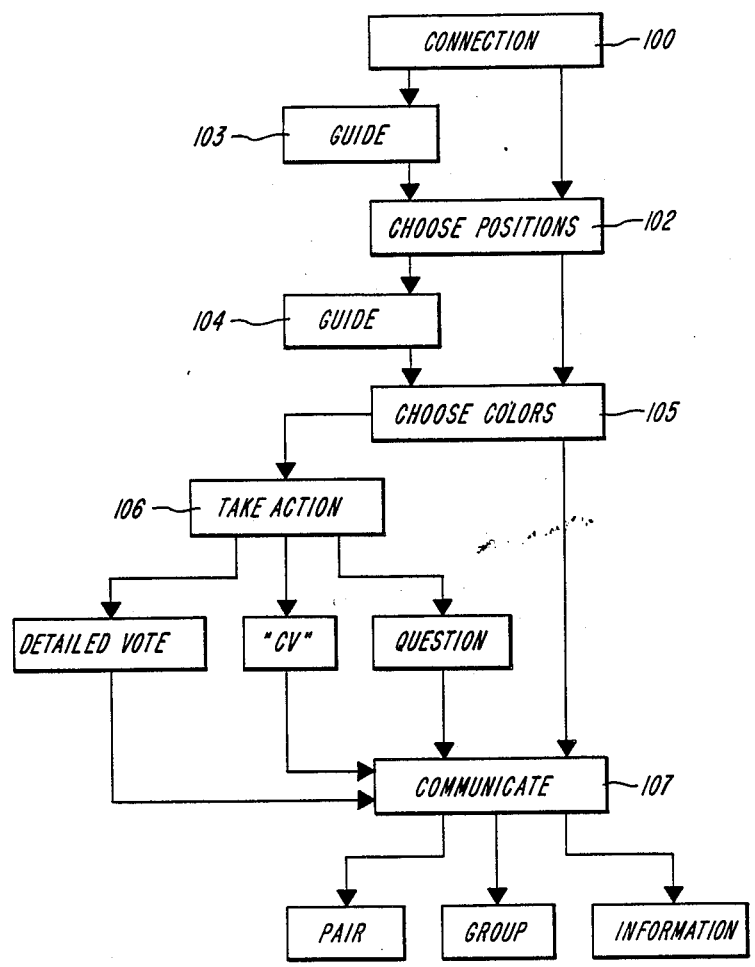
FIG. 2 shows the successive stages of dialog between a user and the server center connected to the telephone network.

FIG. 2 shows the successive stages in one example of dialog between a user and the server center.

After connection (stage 100) the user selects a position (stage 102), optionally after consulting a guide or help facility (stage 103).

In order to select a position, the user selects the portion of the overall image that is to appear on the screen 18a of the terminal 18. The screen 18a then constitutes a window via which the user can view any desired portion of the overall image, while seeing the entire image on the screen of the television receiver 34. The selectable portion of the image is not limited to any complete one of the subimages transmitted over the lines 20. For example, it may be possible to begin by displaying one of the subimages constituting the overall image on the screen 18a, e.g. the top left subimage. Thereafter, the user displaces the window to the desired location, i.e. until the user can see that portion of the overall image on which the user desires to take action. The user controls stepwise displacement by means of the keys in the keyboard 18b.

In a variant, vertical and horizontal co-ordinate references may be associated with the broadcast overall image. The screen 18a can then be positioned by selecting to coordinates of a position in the overall image, with said position then appearing in the center of the screen 18a.

After a position has been chosen, the next stage consists in the user choosing one or more colors (stage 105), optionally after consulting a guide or help facility (stage 104). By choosing one or more colors, after choosing a free position in the overall image, the user can take possession of said position by marking it with a special color or combination of colors selected by acting on the keyboard 18b. The size of a position which a user may occupy is at least one elementary element or square of the image in videotex format, and may, optionally, be several such squares. If only one square is available, only one special color can be programmed. If several squares are available, several colors can be programmed and it is also possible to form a special pattern (e.g. a letter or symbol).

Once the choice of color(s) has been entered, the position occupied by the user appears in the overall image on the screen of the television receiver.

The system of the invention as described so far has a first application as a return channel during a discussion broadcast. Viewers occupy empty positions and they express their votes by means of particular colors, such that the overall image as built up in stages represents audience opinion.

In this example, voting is one of the possible actions offered to users as a function, for example, of the type of program being broadcast. After selecting colors, a user may select a "take action" function or a "communicate" function.

In "take action" mode (stage 106), a choice is offered between the above-described detailed voting operation, sending a curriculum vitae (CV), and sending a question. By send a CV, a user who has a position in the image provides a certain amount of personal information (name, address, telephone number, ...) which is stored in relationship with the coordinates of the user's position in the image. By sending a question, a user can intervene in a television program such as a game or a discussion.

In "communicate" mode (stage 107), the user is given the choice between two-party communication (conventional bulletin board), group communication (conventional bulletin board), or obtaining information such as, for example, the CVs of other users, detailed voting statistics, or the questions asked by other users.

In two-party communication, a user may choose to send a message directly to any one of the viewers present in the image by indicating the co-ordinates of the chosen other party, with the message being displayed on the other party's terminal.

Figure 3:
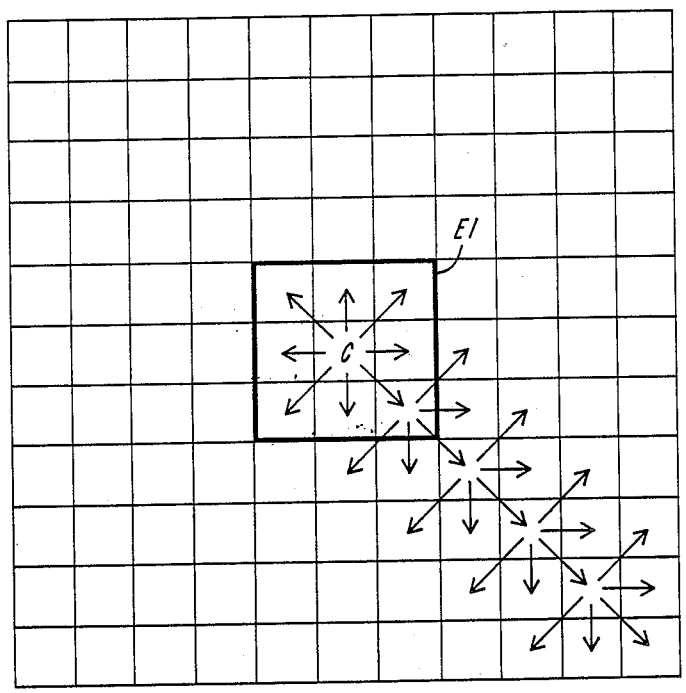
FIG. 3 shows the communications options offered to participants by the remote bulletin board associated with the image.

In multi-party communication, there are several possibilities. A user may, for example, send a message to the terminals of viewers who are geographicsly close in the image, for example those situated contiguously or those situated in the same line or the same column. FIG. 3 shows the communications possibilities from a position symbolized by a square C. During a first communications stage E1, the parties informed are those occupying the eight positions situated around the square C. During subsequent communications stages, the number of parties informed increases stepwise insofar as parties receiving a message agree to retransmit it. In a variant, still within the context of multi-party communications, a user may also be offered the facility of sending a message to all of the terminals of other viewers who have selected the same pattern for marking their positions (e.g. the same color or the same combination of colors).

Thus, the system in accordance with the invention makes it possible to provide close association between a conventional remote bulletin board and the image received on a television receiver.

It is possible to go to "communicate" mode either before or after going to the "take action" mode. The above-described operations are performed by computer programs located in the server center 10.

In the above description, it is assumed that the image is broadcast by means of a television transmitter to television receivers installed in people's homes.

The system of the invention may also be used on a local basis in a public place such as an exhibition, a show, or a museum. Terminals 18 are made available to visitors and the overall image is transmitted, after videotex-to-video decoding and subimage assembly to a video projector installation so as to be projeced on one or more big screens.

Finally, in yet another implementation of the invention, the video image may be generated in real time by a video graphics generator on the basis of the graphics information collected by the server center. This information is transmitted to the video graphics generator in digital form, e.g. over a special purpose link, thereby enabling an image to be generated by video synthesis. Such devices are well known and are constituted by computers which are specially adapted to synthesizing video images.

I claim:

1. An interactive video communications system, comprising a server center connected to a telephone network, means for storing videotex-type graphics information in the server center, said information relating to at least one image, and terminals connected to the telephone network and provided with screens on which at least a portion of the image may be displayed, wherein:
   the server center includes means for chaning the stored graphics information in response to instructions transmitted by users from the terminals; and
   means connected to the server center for converting the graphics information stored in the server center into television-type video signals, thereby enabling a television image to be displayed, to the users on one or more television receiver screens or televisions image projectors other than the screens of the terminals, with at least a portion of the displayed television image corresponding to the image represented by the graphics information stored at any moment in the server center.

2. A system according to claim 1, wherein the video signals are broadcast or inserted into signals being broadcast by a television transmitter.

3. A system according to claim 1, wherein the video signals are transmitted to an apparatus for projecting television images.

4. A system according to claim 1, wherein the graphics information stored in the server center represents an image whose format is a multiple of the format of an image displayed on the screen of a terminal, said information being converted into the form of video signals representing a television image.

* * * * *

UNITED STATES PATENT AND TRADEMARK OFFICE
CERTIFICATE OF CORRECTION

PATENT NO. : 4,896,347
DATED : January 23, 1990
INVENTOR(S) : Olivier Auber

It is certified that error appears in the above-identified patent and that said Letters Patent is hereby corrected as shown below:

On the title page, Item [76]: after Inventor:, "Oliver" should read --Olivier--.

Column 1, line 43, "displayed on" should read --displayed to--.

Column 3, line 15, "digial" should read --digital--.

Column 3, line 64, "to coordinates" should read --the coordinates--.

Column 6, line 5, "chaning" should read --changing--.

Signed and Sealed this

Sixth Day of April, 1993

Attest:

STEPHEN G. KUNIN

*Attesting Officer*  *Acting Commissioner of Patents and Trademarks*